United States Patent
Rydberg (10) Patent No.: US 10,554,886 B2
(45) Date of Patent: Feb. 4, 2020

(54) POWER MANAGEMENT FOR OPTICAL POSITION TRACKING DEVICES

(71) Applicant: Valve Corporation, Bellevue, WA (US)

(72) Inventor: Rob Rydberg, Bothell, WA (US)

(73) Assignee: Valve Corporation, Bellevue, WA (US)

( * ) Notice: Subject to any disclaimer, the term of this patent is extended or adjusted under 35 U.S.C. 154(b) by 12 days.

(21) Appl. No.: 15/984,130

(22) Filed: May 18, 2018

(65) Prior Publication Data

US 2019/0356848 A1 Nov. 21, 2019

(51) Int. Cl.
*H04N 5/232* (2006.01)
*G06F 3/01* (2006.01)
*G02B 27/01* (2006.01)

(52) U.S. Cl.
CPC ..... *H04N 5/23241* (2013.01); *G02B 27/0172* (2013.01); *G06F 3/013* (2013.01); *G09G 2330/021* (2013.01)

(58) Field of Classification Search
CPC ............ H04N 5/23241; G02B 27/0172; G06F 3/013; G09G 2330/021
See application file for complete search history.

(56) References Cited

U.S. PATENT DOCUMENTS

| 9,704,387 | B1 * | 7/2017 | Goodman | G08C 17/02 |
| 2010/0085579 | A1 * | 4/2010 | Carlen | E02F 3/431 |
| | | | | 356/614 |
| 2016/0162012 | A1 | 6/2016 | Chang et al. | |
| 2016/0364910 | A1 | 12/2016 | Higgins et al. | |
| 2017/0038253 | A1 * | 2/2017 | Mallinson | G06F 3/011 |
| 2017/0094255 | A1 * | 3/2017 | Zabatani | G06F 3/0488 |
| 2017/0249019 | A1 | 8/2017 | Sawyer et al. | |
| 2018/0099219 | A1 | 4/2018 | Hope et al. | |

OTHER PUBLICATIONS

The PCT Search Report and Written Opinion dated Jul. 24, 2019 for PCT Application No. PCT/US19/32202, 3 pages.

* cited by examiner

*Primary Examiner* — Stephen G Sherman
(74) *Attorney, Agent, or Firm* — Lee & Hayes, P.C.

(57) ABSTRACT

Described herein are devices and techniques for managing power consumption of a position tracking device. The position tracking device may be a virtual reality (VR) controller having multiple optical sensors oriented to receive optical signals from different directions. A stationary optical emitter projects a laser line into a space and repeatedly scans the laser line through the space. For any given scan, some of the sensors may detect the laser line and some of the sensors may not detect the laser line because they are oriented away from the emitter or because of a blocking object. When an individual sensor fails to detect a laser scan, that sensor is disabled for one or more subsequent laser scans in order to reduce power consumption of the VR controller.

20 Claims, 7 Drawing Sheets

POWER MANAGEMENT FOR OPTICAL POSITION TRACKING DEVICES

BACKGROUND

Virtual reality (VR) systems allow a user to become immersed in a virtual environment by displaying the virtual environment, sensing the position and movement of the user, and responding to the position and movement of the user. VR games often rely on wearable devices or other devices that sense natural movements of the user. For example, rather than operating a joystick to throw punches in a boxing game, the boxing game may receive input regarding the actual positions and movements of a user's hands, so that the user is able play the game by actually punching with their arms and hands. Similarly, a virtual reality system may allow a user to move through a displayed virtual environment by taking physical steps, to grasp objects, to press virtual buttons, and so forth.

In some systems, a user may wear or hold what are referred to as VR controllers. A VR controller is a device that provides output such as audio and video to a user. For example, a user may wear a VR headset that displays the virtual environment to the user. A VR controller may also accept or detect user input, allowing the user to interact with or move relative to elements of the virtual environment. Specifically, some VR controllers detect user positions and movements.

The position and movement of a user may be detected in various ways. In some systems, optical techniques are used to detect user movement. In particular, some systems may use light sensors, positioned on wearable or handheld devices such as VR headsets or VR hand controllers, to detect optical signals that convey position information.

A VR controller typically operates wirelessly, using rechargeable batteries for power. The useable time of the VR controller is therefore limited by the available battery capacity. Accordingly, it is important to minimize or limit the power consumption of VR controllers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein, among other things, are techniques for detecting the three-dimensional position and pose of an object, as well as devices and systems for implementing techniques for position and pose detection.

In accordance with embodiments disclosed herein, an optical emitter is mounted at a stationary position within a room or other space. The optical emitter is configured to scan a laser line through the room to convey positional information to a position tracking device within the room. For example, the scanning of the laser line may be controlled so that the angle at which the laser line is projecting at any instant is a function of the elapsed time after a synchronization pulse. As another example, the laser line may be modulated or otherwise encoded to convey its current instantaneous projection angle as the laser line scans over or through a space.

In the described embodiments, a virtual reality (VR) controller or other moveable or wearable position tracking device has light sensors arranged to receive optical signals from one or more stationary optical emitters as described above. Specifically, an individual light sensor may detect a laser line at the moment that the laser line crosses the light sensor. Information regarding the laser line is then analyzed to determine a position coordinate of the VR controller. For example, the VR controller may measure the time difference between receiving an optical synchronization pulse and subsequently detecting a scanning laser line, and the projection angle of the laser line at the moment that the laser line was detected by the VR controller can then be calculated as a function of this time difference. As another example, the VR controller may demodulate or decode the received laser line signal to obtain an angular coordinate value embedded in the laser line signal, where the angular coordinate corresponds to the projected angle of the laser line at the moment that the laser line was detected by the VR controller.

At any given time, any number of the light sensors may be positioned and oriented so that they can receive and detect a laser line projected from a particular stationary emitter. The VR controller and/or supporting computing devices use the angular position information obtained by analyzing signals from multiple light sensors and multiple stationary emitters to determine a three-dimensional position and pose of the VR controller.

A single emitter, at a single location, may be configured to generate laser lines that are scanned in multiple respective directions, such as along horizontal and vertical axes, so that a VR controller can determine both horizontal and vertical angular coordinates relative to the emitting device. The lasers are scanned in what are referred to as emitter cycles, where the optical signals of each emitter cycle indicate current or new positional information.

In order to reduce power consumption by the light sensors, some light sensors can be disabled in certain situations where these light sensors are unlikely to be able to detect upcoming laser lines. For example, individual sensors may not be facing a particular emitter or may be blocked from receiving signals from the emitter. The VR controller is configured to determine which of its sensors did not detect the laser lines of a particular emitter cycle, and to disable these sensors during one or more subsequent emitter cycles. In some cases, sensors such as this may be disabled only if the VR controller is not moving. In some cases, sensors may be disabled because the input from those sensors is extraneous to a particular application or duplicative of input from other sensors. In some cases, the number of subsequent emitter cycles during which a sensor is disabled may vary depending on the speed at which the VR controller is moving. In some cases, the VR controller may not disable a particular sensor if the sensor is near another sensor that did detect a scanning laser line during the previous emitter cycle. In some cases, the sensor may be disabled for most of an emitter cycle, but enabled during a time span within which the laser line is expected to cross and impinge upon the VR controller. These and other details will be explained in more detail in the following discussion.

Figure 1:
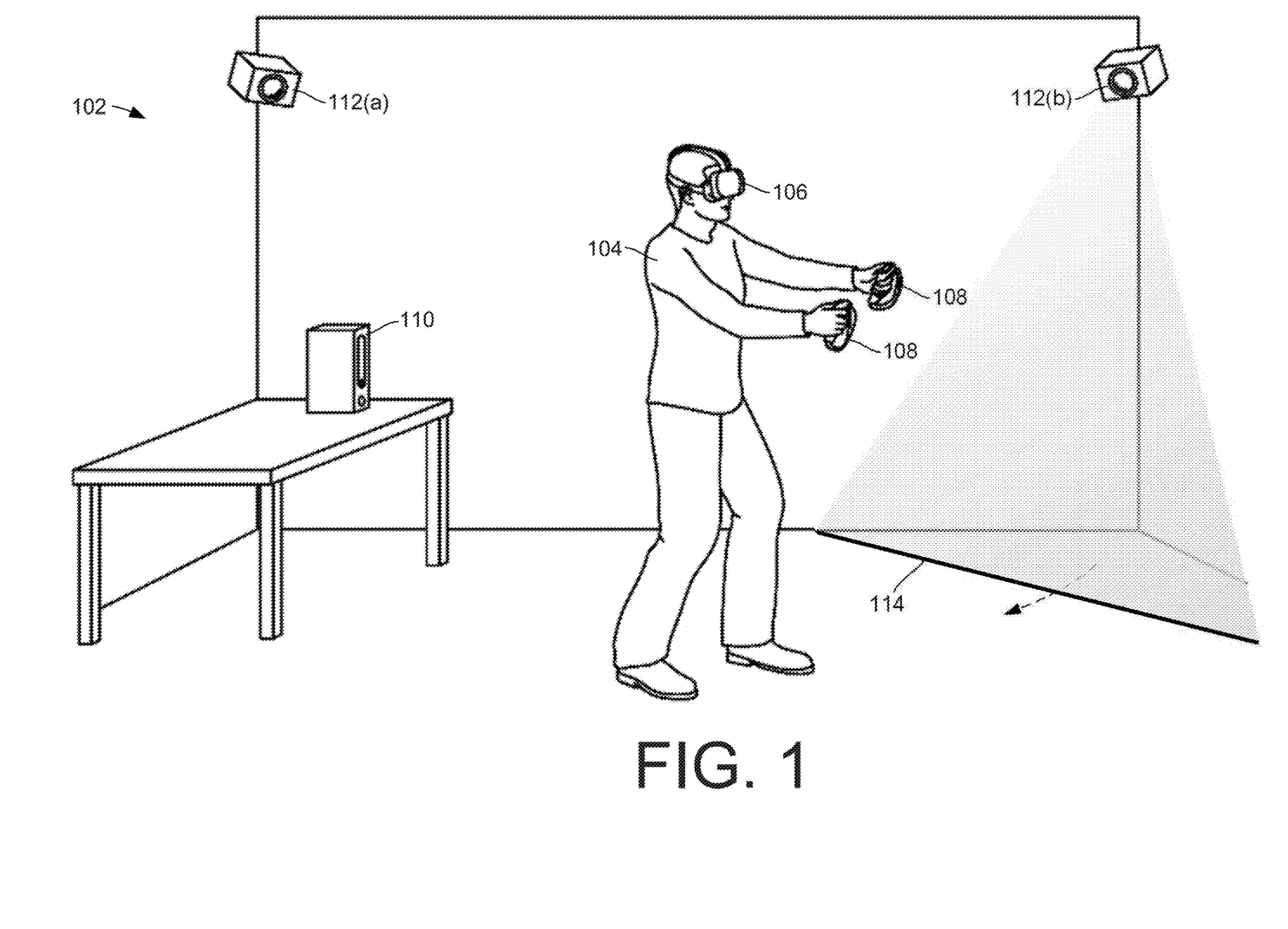
FIG. 1 is a diagram showing a space within which a virtual reality (VR) system operates.

FIG. 1 illustrates the use of virtual reality (VR) controllers in an example embodiment. Specifically, FIG. 1 shows a physical space 102, which in this example is a room, and a user 104 within the space 102. The user 104 is wearing a VR headset 106 and a pair of VR hand controllers 108. The VR headset 106 and the VR hand controllers 108 are examples of wearable components that are referred to as VR controllers or VR motion controllers, and more generally as moveable position tracking devices.

The VR headset 106 has an internal display (not shown) that presents a simulated view of a virtual environment. For example, the simulated view may show a room or other space, and may also show objects within the virtual space. As the user 104 moves, the VR headset 106 senses the movement and the simulated view changes to reflect the new position or orientation of the user 104 within the virtual space. By turning their head, for example, the user 104 may look in different directions and/or at different objects within the virtual environment.

The VR hand controllers 108 similarly sense movements of the hands of the user 104. The virtual environment displayed by the VR headset 106 may include simulated hands that move in accordance with the movement of the user's actual hands. In some embodiments, the VR hand controllers 108 may also sense finger movements, allowing the user 104 to press virtual buttons within the virtual environment, to push against surfaces, to grasp and hold objects, and so forth.

A computer 110, often referred to as a gaming console, may be used in conjunction with the VR controllers 106 and 108 to perform calculations and to generate views of the virtual environment in response to user movements for display by the VR headset 106. The VR controllers may communicate wirelessly with the computer 110 using Bluetooth, WiFi, or other wireless technologies. The VR controllers may also communicate with the computer 110 via the VR headset 106, which may be connected to computer 110 via one or more wires or wirelessly.

The physical space 102 has multiple stationary emitters 112, shown in FIG. 1 as a first emitter 112(a) and a second emitter 112(b), that are mounted on the walls or ceiling of the space 102, directed inwardly with respect to the room. Each emitter 112 emits optical reference signals that are received by the VR controllers 106 and 108 to determine angular position information. Specifically, the VR controllers have optical sensors (not shown in FIG. 1) that receive and analyze the emitted optical reference signals to determine the position and pose of the user 104 relative to the emitters 112 and the space 102. In the described embodiments, the optical signals are in the infrared range and are not visible by the user 104.

Figure 2:
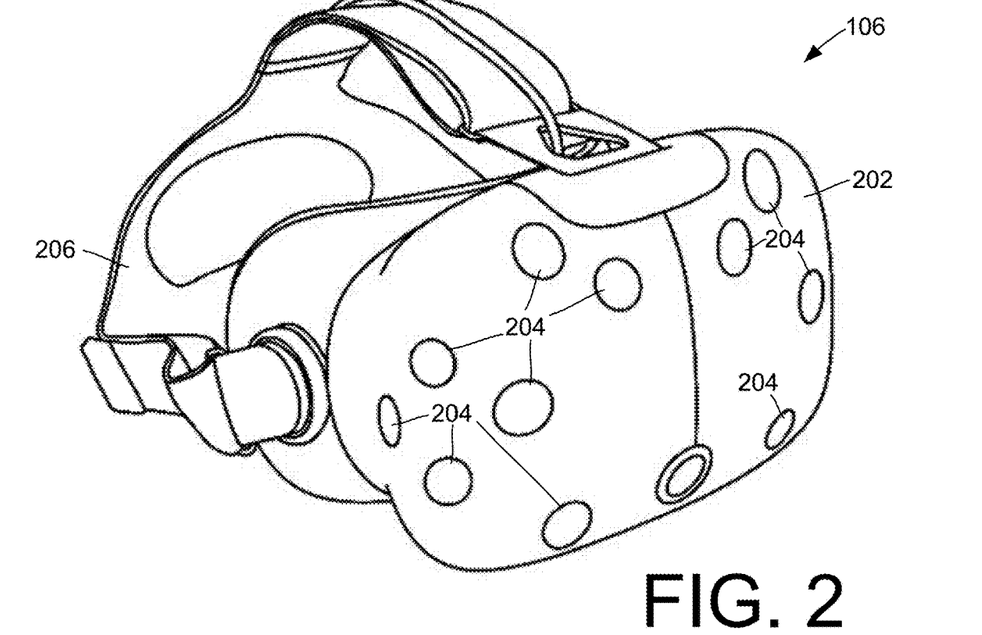
FIG. 2 is a diagram of an example VR headset.

FIG. 2 shows the VR headset 106 in more detail. The headset 106 has a front, outward surface 202 having multiple optical sensors 204 that are distributed and arranged so that they can receive infrared optical signals from different directions. The headset 106 has a headband 206, along which additional sensors (not shown) may be positioned. In some embodiments, the VR headset 106 may comprise a helmet or cap, and sensors may be located at various additional positions on the top of the helmet or cap, to receive optical signals from additional directions.

Figure 3:
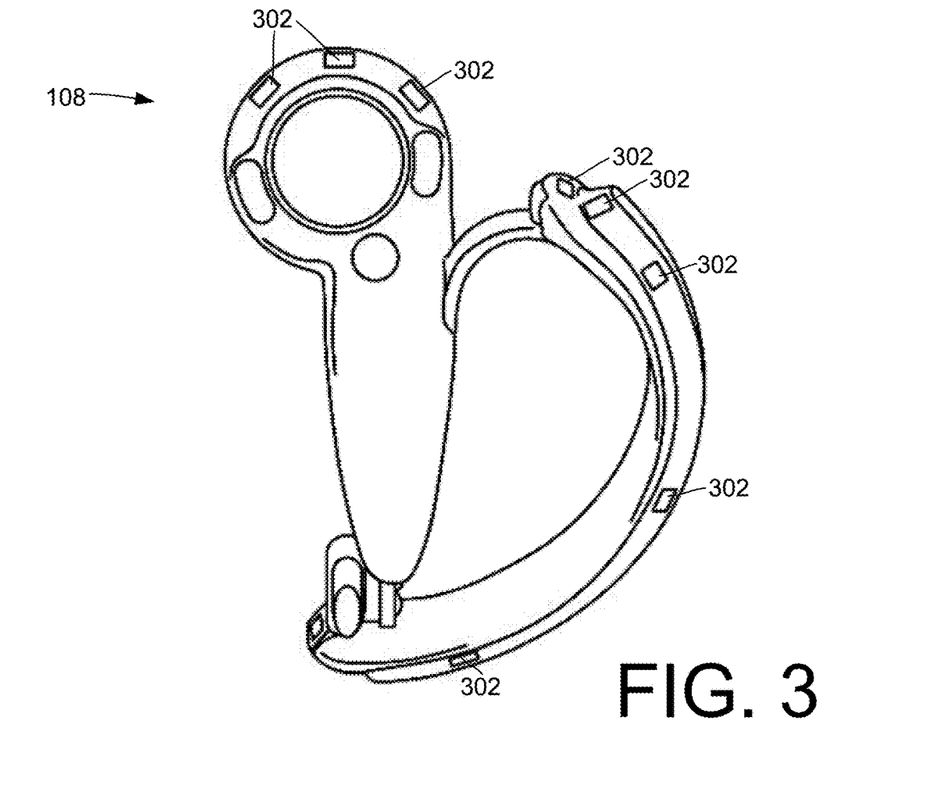
FIG. 3 is a diagram of an example VR hand controller.

FIG. 3 shows one of the VR hand controllers 108 in more detail. The VR hand controller 108 has various surfaces on which optical sensors 302 are positioned. The optical sensors 302 are arranged to receive optical signals from various different directions. The VR hand controller 108 may have buttons, sensors, lights, controls, knobs, indicators, displays, etc., allowing interaction by the user 104 in various ways.

The techniques described herein may be used for various types of position tracking devices, not limited to VR controllers. Some VR controllers may also have inertial measurement units (IMUs) that can be used for motion detection.

Referring again to FIG. 1, each emitter 112 may be configured to repeatedly sweep a laser line 114 through the space 102. The laser line 114 may be generated by a line-projecting laser emitter in conjunction with a rotating mirror, as one example. In FIG. 1, the laser line 114 is projected as a horizontal line that sweeps vertically upward. An individual emitter 112 may also project a laser line as a vertical line that sweeps horizontally. In some embodiments, each emitter 112 may alternately project a vertically sweeping laser line and a horizontally sweeping laser line.

As the laser line 114 moves across or through the space 102, at some point in time a portion of the laser line 114 will be projected onto the user 104 and will impinge on one or more of the sensors 204 and 302 of the VR controllers 106 and 108. The laser line 114 will be detected by any of the sensors that are generally facing the emitter 112 and that are not blocked by the user 104 or by other objects.

For any given sweep or scan of the laser line 114, it may happen that one or more of the sensors 204 or 302 do not receive or detect the laser line 114. As will be explained in more detail below, these sensors may be disabled during one or more subsequent laser line sweeps in order to reduce power consumption. For example, when a given sensor does not detect the laser line during a first sweep of the laser line, that sensor may be disabled during a subsequent second sweep of the laser line, and then re-enabled for a third sweep of the laser line. The optical sensors consume significant power, and disabling any of the sensors can significantly improve battery life of the VR controllers.

Figure 4:
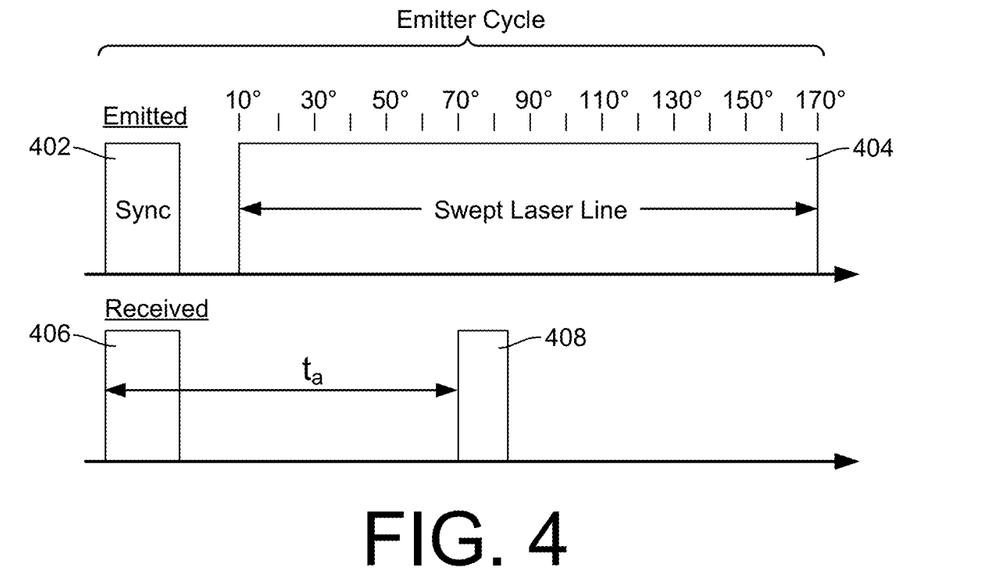
FIG. 4 is a timing diagram showing optical signals emitted by a stationary emitter and corresponding optical signals received by a VR controller in one embodiment.
Figure 5:
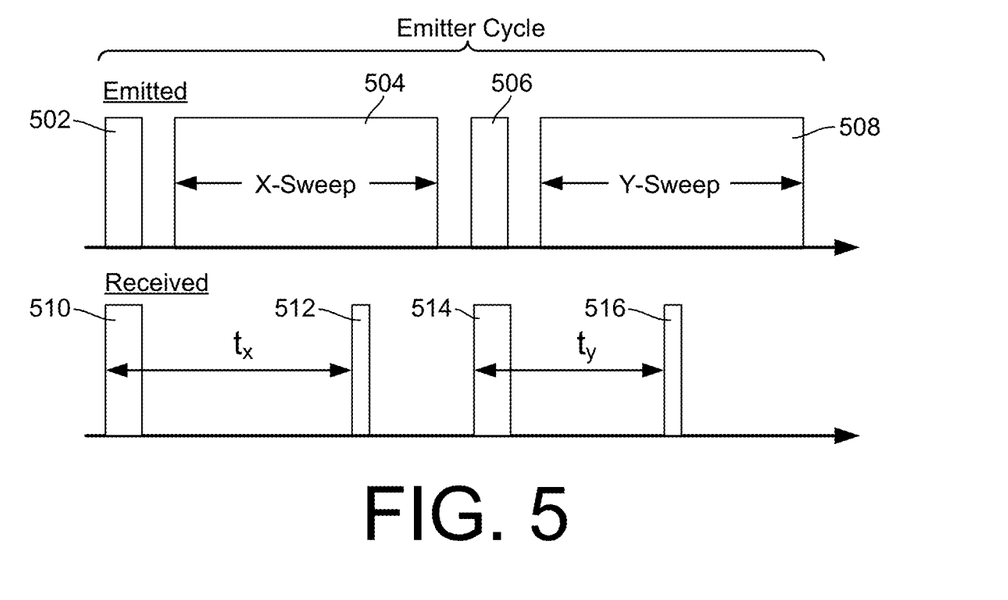
FIG. 5 is a timing diagram showing optical signals emitted by a stationary emitter and corresponding optical signals received by a VR controller in another embodiment.
Figure 6:
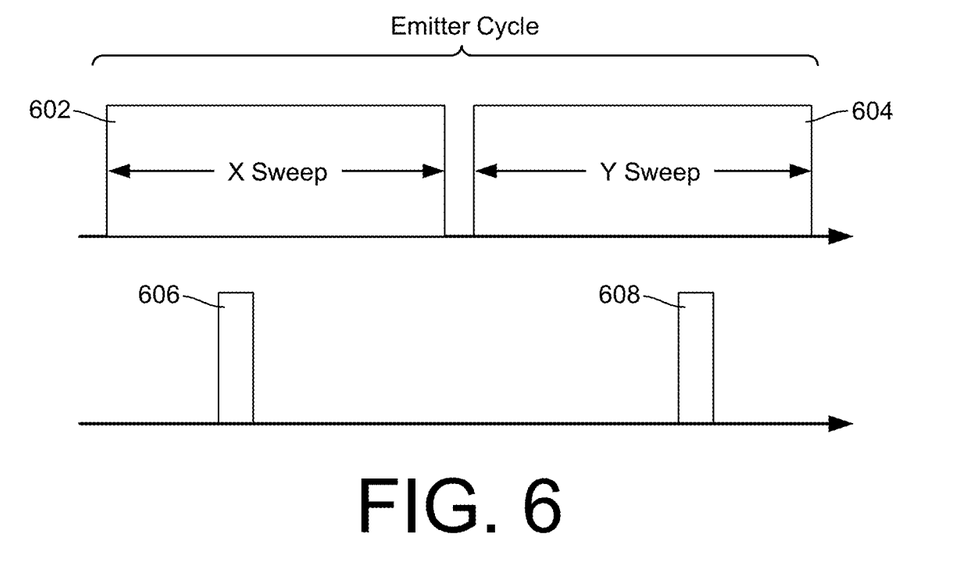
FIG. 6 is a timing diagram showing optical signals emitted by a stationary emitter and corresponding optical signals received by a VR controller in yet another embodiment.

FIG. 4 illustrates a technique for determining an angular coordinate of a VR controller or other position tracking device relative to a single stationary emitter, such as may be performed using the components discussed above. The upper part of FIG. 4, as well as of FIGS. 5 and 6, is a timeline showing optical signal transmissions by a stationary emitter during a single emitter cycle. The lower part of FIG. 4, as well as of FIGS. 5 and 6, is a timeline showing optical signal reception by an optical sensor of a VR controller during the emitter cycle.

During each of multiple emitter cycles, the emitter produces a short, omni-directional synchronization pulse 402 and a longer swept laser line 404. In the illustrated example, the laser line 404 is swept through angles of 10° through 170° at a constant, known angular speed, starting at a fixed, known time after the synchronization pulse 402. The projected angle of the laser line at any time is a linear function of the time elapsed since the most recent synchronization pulse. Note that in some embodiments, there may be more than one synchronization pulse 402.

The optical sensor detects a first signal 406 corresponding to the omni-directional synchronization pulse 402 and a second signal 408 corresponding to the laser line as it passes over and impinges on the optical sensor for a relatively brief time. The angle of the laser line at the time when it impinges on the optical sensor is a linear function of the time $t_a$ between the first signal 406 and the second signal 408.

FIG. 5 shows that a single emitter may be configured to generate two swept laser lines that sweep horizontally and vertically, respectively. In this case, a single emitter cycle may comprise a first synchronization pulse 502 and a corresponding sweep 504 of a laser line in a horizontal or X direction, and a second synchronization pulse 506 and a corresponding sweep 508 of a laser line in a vertical or Y direction. An optical sensor receives a horizontal synchronization signal 510 and a corresponding horizontal laser pulse 512 as the horizontally swept laser line passes over the sensor. The horizontal angle of the sensor relative to the emitter is calculated based on the time $t_x$ between the horizontal synchronization signal 510 and the horizontal laser pulse 512. The same sensor receives a vertical synchronization signal 514 and a corresponding vertical laser pulse 516 as the vertically swept laser line passes over the sensor. The vertical angle of the sensor relative to the emitter is calculated based on the time $t_y$ between the vertical synchronization signal 514 and the vertical laser pulse 516.

Emitter cycles of the first emitter 112(a) and the second emitter 112(b) may be interleaved, allowing the VR controller to determine angular coordinates relative to either or both of the first emitter 112(a) and the second emitter 112(b). A three-dimensional position and pose of the VR controller can be calculated based on these coordinates, derived from monitoring multiple sensors, assuming that the positions of the emitters 112(a) and 112(b) are known.

FIG. 6 illustrates another technique for specifying angular coordinates of a VR controller or other position tracking device relative to a single stationary emitter. In this example, laser transmissions of the emitter are continuously modulated and encoded/or to indicate the current angular coordinate of a swept laser line. Specifically, laser emissions are encoded to indicate, at any point in time, the instantaneous projected angle of the laser line relative to the emitter. This removes the need for a synchronization pulse, so that an emitter cycle comprises a horizontal or X sweep 602 of a laser line and a subsequent vertical or Y sweep 604 of a laser line. When the sensor detects the laser lines at 606 and 608, the laser signals are demodulated or decoded to determine the current angular directions of the laser lines.

Figure 7:
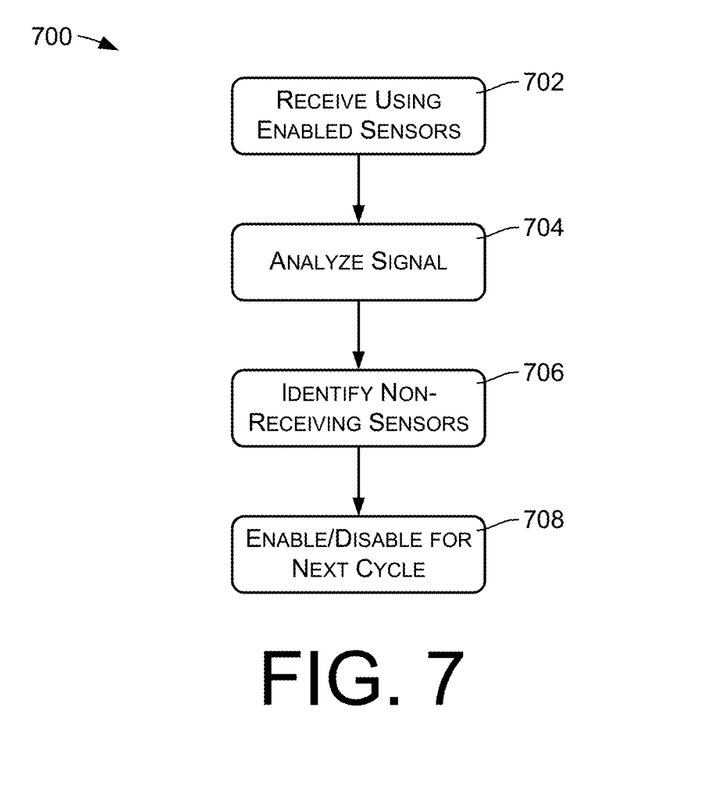
FIG. 7 is a flow diagram illustrating an example method of disabling light sensors to reduce power consumption of a VR controller.

FIG. 7 illustrates an example method 700 of detecting optical reference signals for position detection. The method 700 may be performed by control logic of a position tracking device having multiple optical sensors mounted to receive infrared optical signals from multiple directions. The VR controllers described above are examples of position tracking devices.

The method 700 is performed for each of multiple emitter cycles. In the examples described herein, as illustrated by FIGS. 4-6, each emitter cycle comprises one or more swept laser lines generated by one or more emitters that are at a common location. In some embodiments, an emitter cycle may also comprise one or more synchronization pulses.

In the example of FIG. 4, each emitter cycle comprises an omni-directional synchronization pulse and a following laser line that sweeps through a space, producing the pulse 408 as the laser line passes over a sensor.

In the example of FIG. 5, each emitter cycle comprises a horizontal measurement cycle and a vertical measurement cycle. The horizontal measurement cycle comprises an omni-directional synchronization pulse and a following laser line that sweeps horizontally through a space to produce the pulse 512 as the laser line passes over a sensor. The vertical measurement cycle comprises an omni-directional synchronization pulse and a following laser line that sweeps vertically through the space to produce the pulse 516 as the laser line passes over a sensor.

In the example of FIG. 6, each emitter cycle comprises a first laser line that sweeps horizontally through a space to produce a laser pulse 606 and a following second laser line that sweeps vertically through the space to produce the laser pulse 608 as the laser line passes over a sensor. In the example of FIG. 6, each laser line is modulated or otherwise encoded to indicate a current, instantaneous projection angle of the laser line.

FIG. 7 illustrates actions that are performed with respect to signals emitted from a single stationary emitter, or from multiple emitters at a single location. Some embodiments may include multiple stationary emitters, at different locations, and the method 700 may be performed independently for the emitter cycles of each emitter or emitter location.

An action 702 comprises receiving an optical reference signal from a stationary emitter using at least one of multiple optical sensors that are mounted on the position tracking device. In the embodiments described herein, the action 702 comprises receiving and detecting a swept laser line using the sensors of the position tracking device. The laser line may be received and detected by multiple currently enabled sensors of the position tracking device, wherein individual sensors are enabled and disabled in accordance with subsequent actions of FIG. 7. In some cases, the swept laser line may be created using a laser signal that has been coded to specify a position coordinate that varies in accordance with the current projection angle of the laser line.

An action 704 comprises analyzing the optical reference signal to determine a position coordinate relative to the stationary emitter. As described above, the optical reference signal may comprise a swept laser line, and the action 704 may comprise (a) determining the time difference between detecting the swept laser line and a receiving a preceding synchronization signal, and (b) determining an angular position coordinate of the position tracking device based at least in part on the time difference. In other cases, the action 704 may comprise decoding angular position information from a received laser signal.

Note that the action 704 may be performed in part by a support component other than the VR controller, such as by the computer 110 of FIG. 1. For example, in some cases the VR controller may report a time difference to the computer 110, and the computer 110 may use the time difference to compute the angular position coordinate. The computer 110 may further use calculated angular position coordinates from multiple emitters, at multiple locations, to determine a three-dimensional position and pose of the VR controller.

An action 706 comprises identifying any of the multiple optical sensors that did not receive or detect the optical reference signal during the emitter cycle. These optical sensors are referred to herein as non-receiving sensors.

An action 708 comprises enabling or disabling individual sensors to reduce power consumption, based at least in part on the action 706 of identifying non-receiving sensors. Generally, the action 708 comprises disabling any non-receiving sensor for a subsequent emitter cycle, and then re-enabling the non-receiving sensor after the subsequent emitter cycle. In some embodiments, the action 708 may comprise disabling each non-receiving sensor for a number of subsequent emitter cycles. In some cases, the number of subsequent emitter cycles during which the sensor is disabled may be dependent on whether the position tracking device is moving and/or the speed at which the position tracking device is moving.

FIGS. 8A, 8B, 8C, and 8D illustrate several ways in which the action 708 may be implemented. The illustrated actions of each of these figures are performed with respect to each sensor of a VR controller or other position tracking device, and are repeated for each emitter cycle.

Figure 8A:
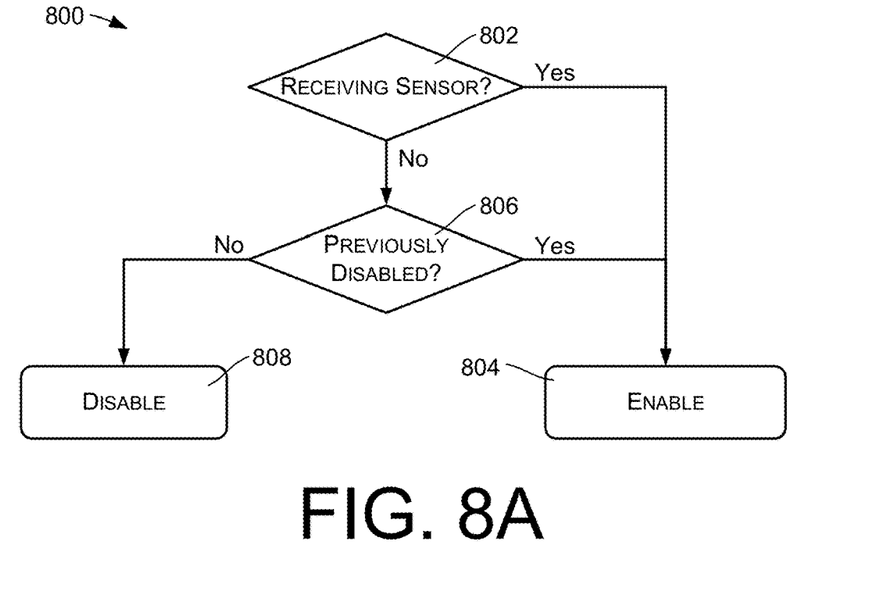
FIGS. 8A, 8B, 8C, and 8D are flow diagrams illustrating further details of disabling sensors to reduce power consumption of a VR controller.

In FIG. 8A, an action 802 comprises determining whether a sensor received and detected the optical reference signal of the current emitter cycle. If the sensor did receive and detect the optical reference signal, an action 804 is performed of enabling the sensor for a subsequent emitter cycle.

If the sensor did not receive and detect the optical reference signal, an action 806 is performed. The action 806 comprises determining whether the sensor was disabled during the current emitter cycle. If the sensor was disabled, the action 804 is performed of enabling the sensor for the subsequent emitter cycle.

If the sensor was not disabled during the current emitter cycle, an action 808 is performed of disabling the sensor for the subsequent emitter cycle.

Figure 8B:
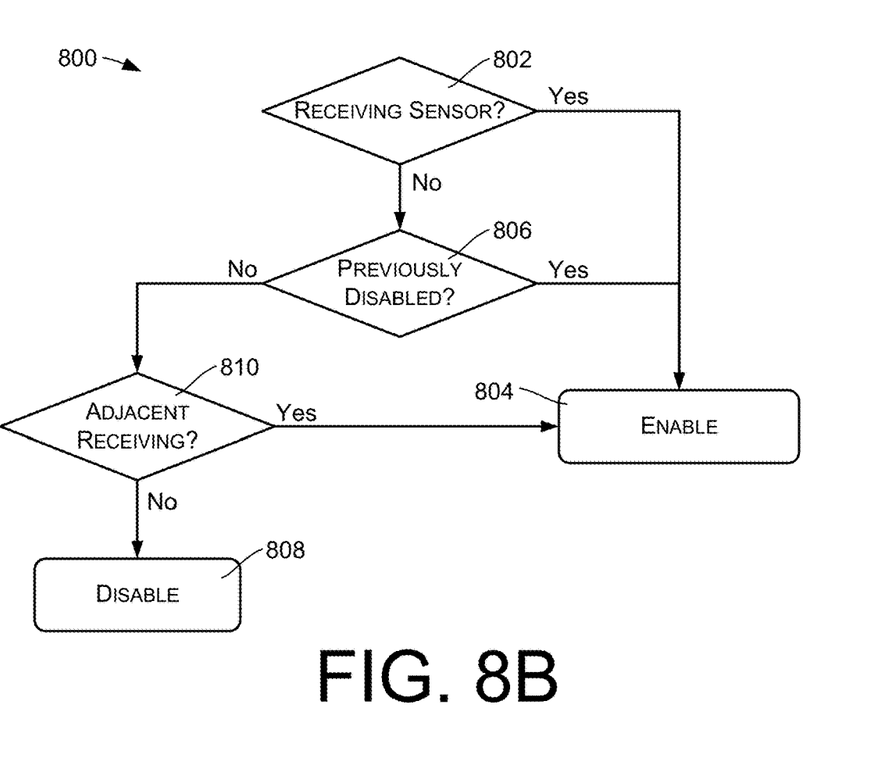

FIG. 8B shows an example implementation that is similar to that of FIG. 8A, except for an additional action 810. Before performing the action 806 of disabling a non-receiving sensor, the action 810 is performed to determine whether the non-receiving sensor is adjacent another sensor that did receive the optical reference signal during the emitter cycle. The action 808 is performed if the sensor is not adjacent to another sensor that did receive the optical reference signal. In response to determining that the sensor is adjacent to another sensor that did receive the optical reference signal, the action 804 is performed of enabling the sensor for the subsequent emitter cycle, even though the sensor may not have received the optical reference signal in the current emitter cycle.

Figure 8C:
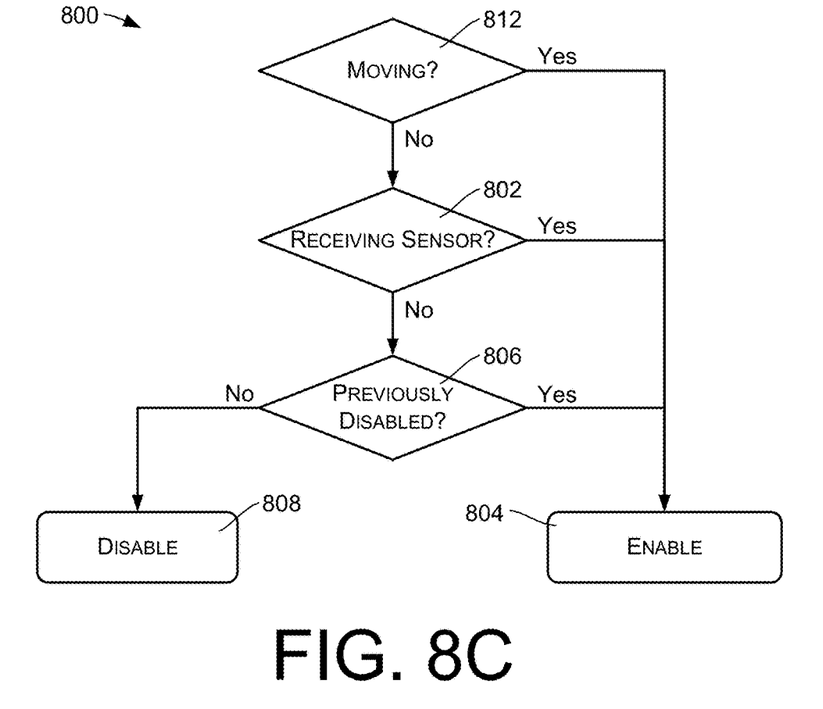

FIG. 8C shows an example implementation that is similar to that of FIG. 8A, except for the addition of an action 812 that is performed initially, before other illustrated actions. The action 812 comprises determining whether the position tracking device is moving. If the position tracking device is moving, the action 804 is performed of enabling the sensor for the subsequent emitter cycle, regardless of whether the sensor is a receiving sensor or a non-receiving sensor. The other actions of FIG. 8C are performed if the position tracking device is not moving.

Whether the position tracking device is moving may be determined, as an example, by monitoring an accelerometer or inertial monitoring device (IMU) of the position tracking device. As another example, movement of the position tracking device may be determined by monitoring previous position calculations that were made using the previously determined angular coordinates.

Figure 8D:
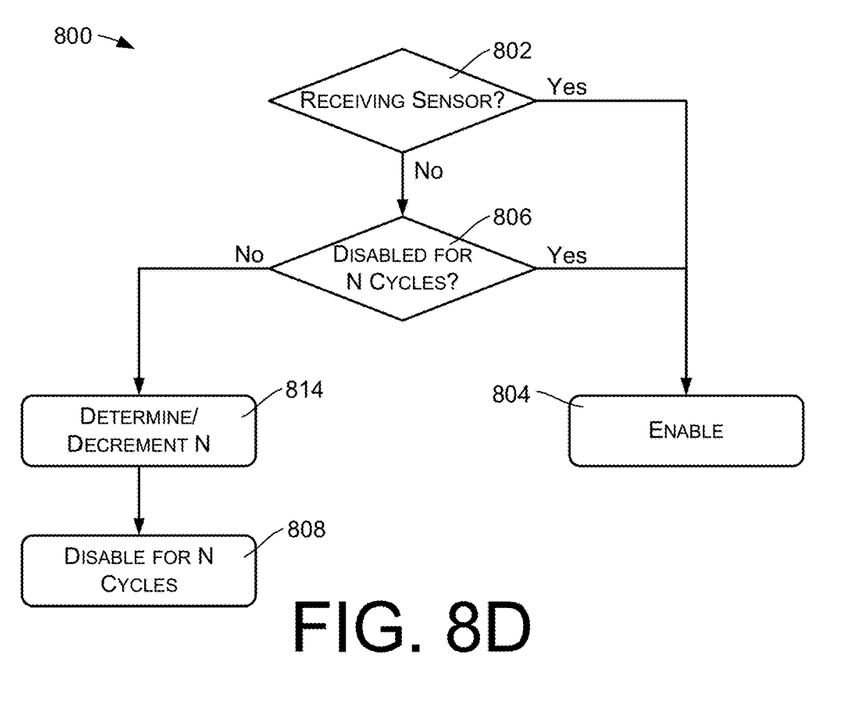

FIG. 8D shows an example implementation that is similar to that of FIG. 8A. In this example, before performing the action 808 of disabling a non-receiving sensor, an action 814 is performed of determining a variable number of emitter cycles for which the non-receiving sensor will be disabled. The action 808 then comprises disabling the non-receiving sensor for the determined number of emitter cycles. The action 806 is modified to determine, during each iteration of the method 800, whether a non-receiving sensor has been disabled for the determined number N of cycles. If the non-receiving sensor has been disabled for the determined number of cycles, the action 804 is performed of enabling the sensor. If the non-receiving sensor has not already been disabled for N emitter cycles, the action 814 is performed. For a sensor that has already been disabled, the action 814 may comprise incrementing or decrementing a counter, such as by incrementing decrementing N, in order to track the number of cycles during which the emitter has been disabled.

The action 814 may be based on various factors. For example, the variable number N may account for previously detected movement of the position tracking device, and N may be made smaller if the position tracking device is or has been moving. As another example, the action 814 may include detecting a speed at which the position tracking device is moving, and N may be based at least in part on the speed of the position tracking device. That is, N may be made larger when the position tracking device is moving more slowly, and smaller when the position tracking device is moving faster. N may also depend on external input, such as input regarding an expected position detection performance, such as sensitivity, accuracy, and/or latency. For example, a game or other application that is using information generated based on information provided by the VR controller may specify, during operation, varying levels of expected position detection performance. N may be made smaller to achieve higher performance, and larger when such performance is not needed in order to conserve battery usage.

The variations shown in FIGS. 8A, 8B, 8C, and 8D, as well as other variations, may be used individually or may be combined and used together.

Figure 9:
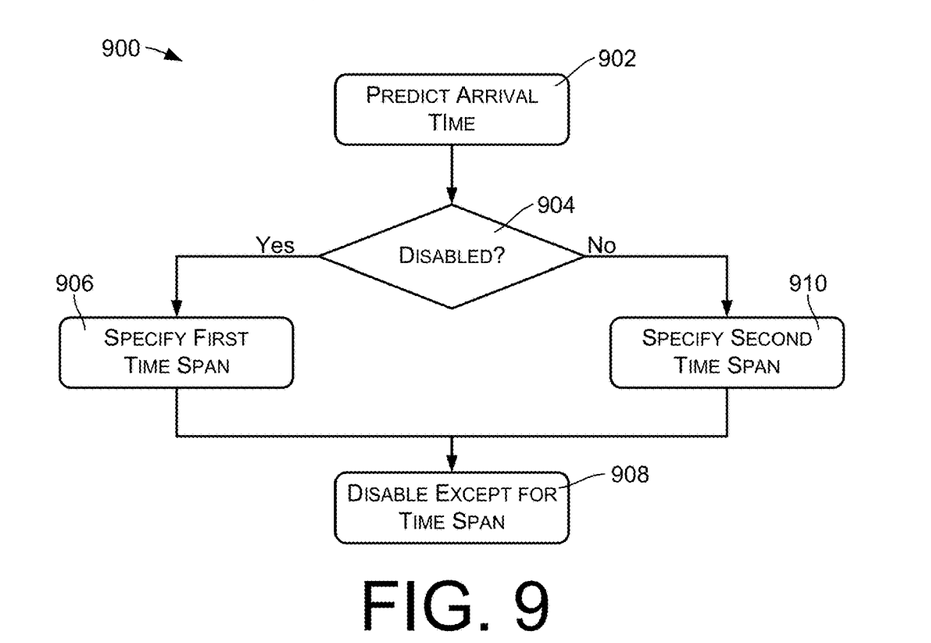
FIG. 9 is a flow diagram illustrating yet further details of disabling sensors in an alternative embodiment.

FIG. 9 illustrates an example method of enabling and disabling sensors that may be used in some embodiments. In some embodiments, each sensor may be either enabled or disabled during an entire emitter cycle. In other embodiments, as shown in FIG. 9, sensors may be disabled during a portion of an emitter cycle and enabled during another portion of the emitter cycle. The actions of FIG. 9 are performed individually for each sensor.

An action 902 comprises predicting an expected arrival time of an optical reference signal based on an observed arrival time of the optical reference signal during a previous emitter cycle. In many cases, the optical signal can be reliably predicted to arrive at a time that is the same as or close to the same as its previous arrival time in the previous emitter cycle. Accordingly, the predicted arrival time for a given emitter cycle may be determined as being the actual arrival time of the optical reference signal in the previous emitter cycle.

An action 904 comprises determining whether the sensor has been otherwise disabled for the current emitter cycle, such as being disabled using any of the methods shown by FIG. 8A, 8B, 8C, or 8D. If the sensor has been disabled, an action 906 is performed of specifying a first time span within the current emitter cycle, where the first time span encompasses the predicted arrival time of the optical reference signal. An action 908 is then performed of disabling the sensor during portions of the emitter cycle other than the specified first time span. That is, the sensor is disabled at times during the emitter cycle other than the first time span, but enabled during the first time span.

If the sensor has not been otherwise disabled by actions FIG. 8A, 8B, 8C, or 8D, an action 910 is performed of specifying a second time span within the current emitter cycle, where the second time span is longer than the first time span. In certain embodiments, the second time span may encompass both the predicted arrival time and the first time span. The action 908 is then performed of disabling the sensor during portions of the emitter cycle other than the specified second time span. That is, the sensor is enabled during the second time span, but disabled at times during the emitter cycle other than the first time span.

The second time span may be specified as being longer than the first time span to account for potential movement of the position tracking device in the time between emitter cycles. In some cases, the second time span may comprise most or all of the emitter cycle.

Figure 10:
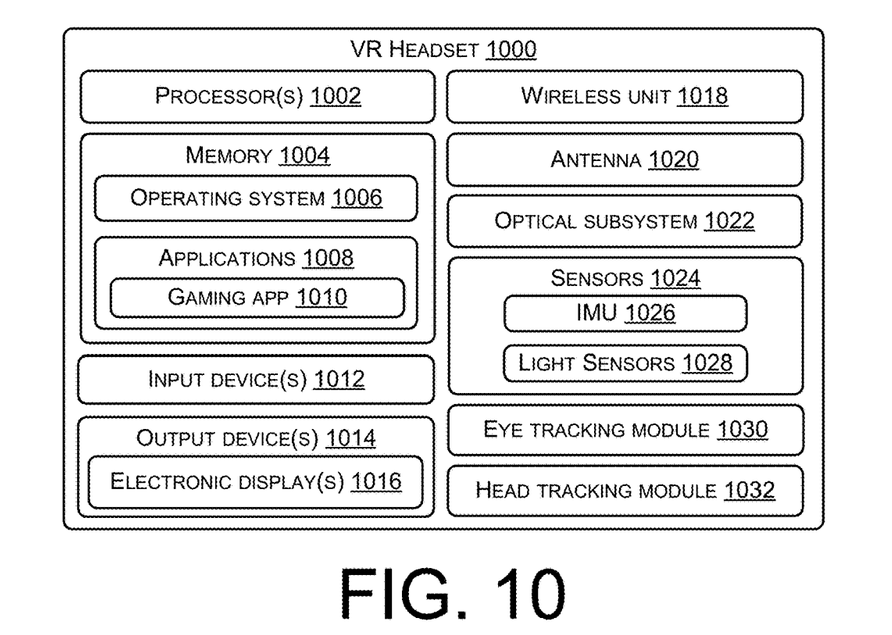
FIG. 10 is a block diagram of a VR controller that may embody the methods and techniques described herein.

FIG. 10 illustrates example components of a VR headset 1000 that may embody features and techniques described herein. A VR headset is illustrated as an example of various different types of VR controllers, wearable devices, and/or position tracking devices, which may be used in conjunction with the described features and techniques.

The VR headset 1000 may be implemented as a stand-alone device that is to be worn by a user. In some embodiments, the VR headset 1000 comprises a virtual reality (VR) or augmented reality (AR) headset that includes a near-eye or near-to-eye display(s).

In the illustrated implementation, the VR headset 1000 includes one or more processors 1002 and memory 1004 (e.g., computer-readable media). In some implementations, the processor(s) 1002 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1002 may possess its own local memory, which also may store program modules, program data, and/or one or more operating systems.

The memory 1004 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 1004 may be implemented as computer-readable storage media ("CRSM"), which may be any available physical media accessible by the processor(s) 1002 to execute instructions stored on the memory 1004. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1002.

Several modules such as instruction, datastores, and so forth may be stored within the memory 1004 and configured to execute on the processor(s) 1002. A few example functional modules are shown as applications stored in the memory 1004 and executed on the processor(s) 1002, although the same functionality may alternatively be implemented in hardware, firmware, or as a system on a chip (SOC).

An operating system module 1006 may be configured to manage hardware within and coupled to the VR headset 1000 for the benefit of other modules. In addition, in some instances the VR headset 1000 may include one or more applications 1008 stored in the memory 1004 or otherwise accessible to the VR headset 1000. In this implementation, the application(s) 1008 include a gaming application 1010. However, the VR headset 1000 may include any number or type of applications and is not limited to the specific example shown here. The gaming application 1010 may be configured to initiate gameplay of a video-based, interactive game (e.g., a VR game) that is playable by a user.

Generally, the VR headset 1000 has input devices 1012 and output devices 1014. The input devices 1012 may include control buttons. In some implementations, one or more microphones may function as input devices 1012 to receive audio input, such as user voice input. In some implementations, one or more cameras or other types of sensors (e.g., inertial measurement unit (IMU)) may function as input devices 1012 to receive gestural input, such as a hand and/or head motion of the user. In some embodiments, additional input devices 1012 may be provided in the form of a keyboard, keypad, mouse, touch screen, joystick, and the like. In other embodiments, the VR headset 1000 may omit a keyboard, keypad, or other similar forms of mechanical input. Instead, the VR headset 1000 may be implemented using relatively simplistic forms of the input device 1012, a network interface (wireless or wire-based), power, and processing/memory capabilities. For example, a limited set of one or more input components may be employed (e.g., a dedicated button to initiate a configuration, power on/off, etc.) so that the VR headset 1000 can thereafter be used. In one implementation, the input device(s) 1012 may include control mechanisms, such as basic volume control button(s) for increasing/decreasing volume, as well as power and reset buttons.

The output devices 1014 may include a display 1016, a light element (e.g., LED), a vibrator to create haptic sensations, a speaker(s) (e.g., headphones), and/or the like. There may also be a simple light element (e.g., LED) to indicate a state such as, for example, when power is on. The electronic display(s) 1016 shown in FIG. 10 may function as output devices 1014 to output visual/graphical output.

The VR headset 1000 may further include a wireless unit 1018 coupled to an antenna 1020 to facilitate a wireless connection to a network. The wireless unit 1018 may implement one or more of various wireless technologies, such as Wi-Fi, Bluetooth, etc. It is to be appreciated that the VR headset 1000 may further include physical ports to facilitate a wired connection to a network, a connected peripheral device, or a plug-in network device that communicates with other wireless networks.

The VR headset 1000 may further include an optical subsystem 1022 that directs light from the electronic display 1016 to a user's eye(s) using one or more optical elements. The optical subsystem 1022 may include various types and combinations of different optical elements, including, without limitations, such as apertures, lenses (e.g., Fresnel lenses, convex lenses, concave lenses, etc.), filters, and so forth. In some embodiments, one or more optical elements in the optical subsystem 1022 may have one or more coatings, such as anti-reflective coatings. Magnification of the image light by the optical subsystem 1022 allows the electronic display 1016 to be physically smaller, weigh less, and consume less power than larger displays. Additionally, magnification of the image light may increase a field-of-view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). The optical subsystem 1022 may be designed to correct one or more optical errors, such as, without limitation, barrel distortion, pincushion distortion, longitudinal chromatic aberration, transverse chromatic aberration, spherical aberration, chromatic aberration, field curvature, astigmatism, and so forth. In some embodiments, content provided to the electronic display 1016 for display is pre-distorted, and the optical subsystem 1022 corrects the distortion when it receives image light from the electronic display 1016 generated based on the content.

The VR headset 1000 may further include one or more sensors 1024, such as sensors used to generate motion, position, and orientation data. These sensors 1024 may be or include gyroscopes, accelerometers, magnetometers, video cameras, color sensors, or other motion, position, and orientation sensors. The sensors 1024 may also include sub-portions of sensors, such as a series of active or passive markers that may be viewed externally by a camera or color sensor in order to generate motion, position, and orientation data.

In one example, the sensor(s) 1024 may include an inertial measurement unit (IMU) 1026. IMU 1026 may be an electronic device that generates motion data based on measurement signals received from accelerometers, gyroscopes, magnetometers, and/or other sensors suitable for detecting motion, correcting error associated with IMU 1026, or some combination thereof. Based on the measurement signals such motion-based sensors, such as the IMU 1026, may generate calibration data indicating an estimated position of VR headset 1000 relative to an initial position of VR headset 1000. For example, multiple accelerometers may measure translational motion (forward/back, up/down, left/right) and multiple gyroscopes may measure rotational motion (e.g., pitch, yaw, and roll). The IMU 1026 can, for example, rapidly sample the measurement signals and calculate the estimated position of VR headset 1000 from the sampled data. For example, IMU 1026 may integrate measurement signals received from the accelerometers over time to estimate a velocity vector and integrates the velocity vector over time to determine an estimated position of a reference point on VR headset 1000.

As another example, the sensors 1024 may include optical light sensors 1028, which may be used as described above for detecting optical signals and for determining the position and pose of the VR headset 1000. The light sensors 1028 may comprise infrared light-sensitive photo diodes, as an example.

The VR headset 1000 may further include an eye tracking module 1030. A camera or other optical sensor inside VR headset 1000 may capture image information of a user's eyes, and the eye tracking module 1030 may use the captured information to determine interpupillary distance, interocular distance, a three-dimensional (3D) position of each eye relative to VR headset 1000 (e.g., for distortion adjustment purposes), including a magnitude of torsion and rotation (i.e., roll, pitch, and yaw) and gaze directions for each eye. In one example, infrared light is emitted within VR headset 1000 and reflected from each eye. The reflected light is received or detected by a camera of the VR headset 1000 and analyzed to extract eye rotation from changes in the infrared light reflected by each eye.

Many methods for tracking the eyes of a user can be used by the eye tracking module 1030. Accordingly, the eye tracking module 1030 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 1030 may integrate information from past measurements, measurements identifying a position of a user's head, and 3D information describing a scene presented by the electronic display 1016. Thus, information for the position and orientation of the user's eyes is used to determine the gaze point in a virtual scene presented by the VR headset 1000 where the user is looking.

The VR headset 1000 may further include a head tracking module 1032. The head tracking module 1032 may leverage one or more of the sensors 1024 to track head motion of the user, as described above.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method, comprising:
   receiving, at a first optical sensor, an optical signal from a stationary emitter during a first emitter cycle;
   analyzing the optical signal to determine a position coordinate relative to the stationary emitter;
   determining that a second optical sensor did not receive the optical signal during the first emitter cycle; and
   disabling the second optical sensor during at least a first portion of a second emitter cycle based at least in part on determining that the second optical sensor did not receive the optical signal.

2. The method of claim 1, further comprising:
   determining that a third optical sensor did not receive the optical signal during the first emitter cycle;
   determining that the third optical sensor is adjacent to a fourth optical sensor that received the optical signal during the first emitter cycle; and
   in response to determining that the third optical sensor is adjacent the fourth optical sensor, enabling the third optical sensor during the second emitter cycle.

3. The method of claim 1, wherein the first emitter cycle comprises:
   an omni-directional synchronization pulse; and
   a laser line that sweeps through a space.

4. The method of claim 1, wherein:
   the first emitter cycle comprises a laser line that sweeps through a space; and
   the laser line is encoded to indicate a current projection angle of the laser line.

5. The method of claim 1, further comprising:
   receiving information regarding expected performance; and disabling the second optical sensor for a number of emitter cycles after the first emitter cycle, wherein the number is based at least in part on the expected performance.

6. The method of claim 1, wherein the first optical sensor and the second optical sensor are disposed on a device, the method further comprising:
  determining whether the device is moving; and
  disabling the second optical sensor for a number of emitter cycles after the first emitter cycle, wherein the number is based at least in part on whether the device is moving.

7. The method of claim 1, wherein the first optical sensor and the second optical sensor are disposed on a device, the method further comprising:
  detecting a speed of the device; and
  disabling the second optical sensor for a number of emitter cycles after the first emitter cycle, wherein the number is based at least in part on the speed of the device.

8. The method of claim 1, wherein the optical signal comprises a first optical signal, the method further comprising:
  determining an expected arrival time of a second optical signal associated with the second emitter cycle based at least in part on an observed arrival time of the first optical signal during the first emitter cycle;
  determining a first time span within the second emitter cycle that encompasses the expected arrival time of the second optical signal; and
  enabling the second optical sensor during the first time span.

9. The method of claim 8, further comprising:
  determining a second time span within the second emitter cycle that encompasses the expected arrival time of the second optical signal, the second time span being longer than the first time span;
  determining that a third optical sensor did not receive the first optical signal during the first emitter cycle; and
  disabling the third optical sensor during the second time span of the second emitter cycle.

10. A method, comprising
  detecting, at a first optical sensor, a swept laser line during a first emitter cycle;
  determining a position coordinate based at least in part on the swept laser line;
  determining that a second optical sensor did not detect the swept laser line; and
  based at least in part on determining that the second optical sensor did not detect the swept laser line, disabling the second optical sensor during at least a portion of a second emitter cycle.

11. The method of claim 10, further comprising:
  receiving a synchronization signal; and
  determining a time difference between receiving the synchronization signal and detecting the swept laser line;
  wherein determining the position coordinate is based at least in part on the time difference.

12. The method of claim 10, wherein detecting the swept laser line comprises receiving a laser signal that is encoded to specify the position coordinate.

13. The method of claim 10, further comprising:
  identifying a first time span within the second emitter cycle based at least in part on a time at which the first optical sensor detected the swept laser line; and
  enabling the second optical sensor during the first time span.

14. The method of claim 13, further comprising:
  identifying a second time span within the second emitter cycle, wherein the second time span is longer than the first time span, and wherein the second time span encompasses the first time span;
  determining that a third optical sensor detected the swept laser line; and
  enabling the third optical sensor during the second time span.

15. A position tracking device, comprising:
  optical sensors;
  one or more processors; and
  one or more computer-readable media storing computer-executable instructions that, when executed, cause the one or more processors to perform acts comprising:
    receiving, via a first optical sensor of the optical sensors, an optical signal from an emitter;
    determining a position coordinate of the position tracking device relative to the emitter based at least in part on the optical signal;
    determining that a second optical sensor of the optical sensors did not receive the optical signal; and
    disabling the second optical sensor during at least a first portion of a second emitter cycle based at least in part on determining that the second optical sensor did not receive the optical signal.

16. The position tracking device of claim 15, wherein the first emitter cycle comprises:
  an omni-directional synchronization pulse; and
  a laser line that sweeps through a space.

17. The position tracking device of claim 15, wherein:
  the first emitter cycle comprises a laser line that sweeps through a space; and
  the laser line is encoded to indicate a current projection angle of the laser line.

18. The position tracking device of claim 15, the acts further comprising:
  receiving information regarding an expected performance; and
  disabling the second optical sensor for a number of emitter cycles after the first emitter cycle, wherein the number is based at least in part on the expected performance.

19. The position tracking device of claim 15, the acts further comprising:
  determining a speed of the position tracking device; and
  disabling the second optical sensor for a number of emitter cycles after the first emitter cycle, wherein the number is based at least in part on the speed of the position tracking device.

20. The position tracking device of claim 15, further comprising an inertial measurement unit (IMU), wherein the optical signal comprises a first optical signal, and the acts further comprising:
  identifying a third optical sensor of the optical sensors that did not receive a second optical signal during a third emitter cycle;
  receiving, from the IMU, an indication that the position tracking device is moving; and
  enabling the second optical sensor during a fourth emitter cycle in response to receiving the indication.

* * * * *